United States Patent Office 3,179,449
Patented Apr. 20, 1965

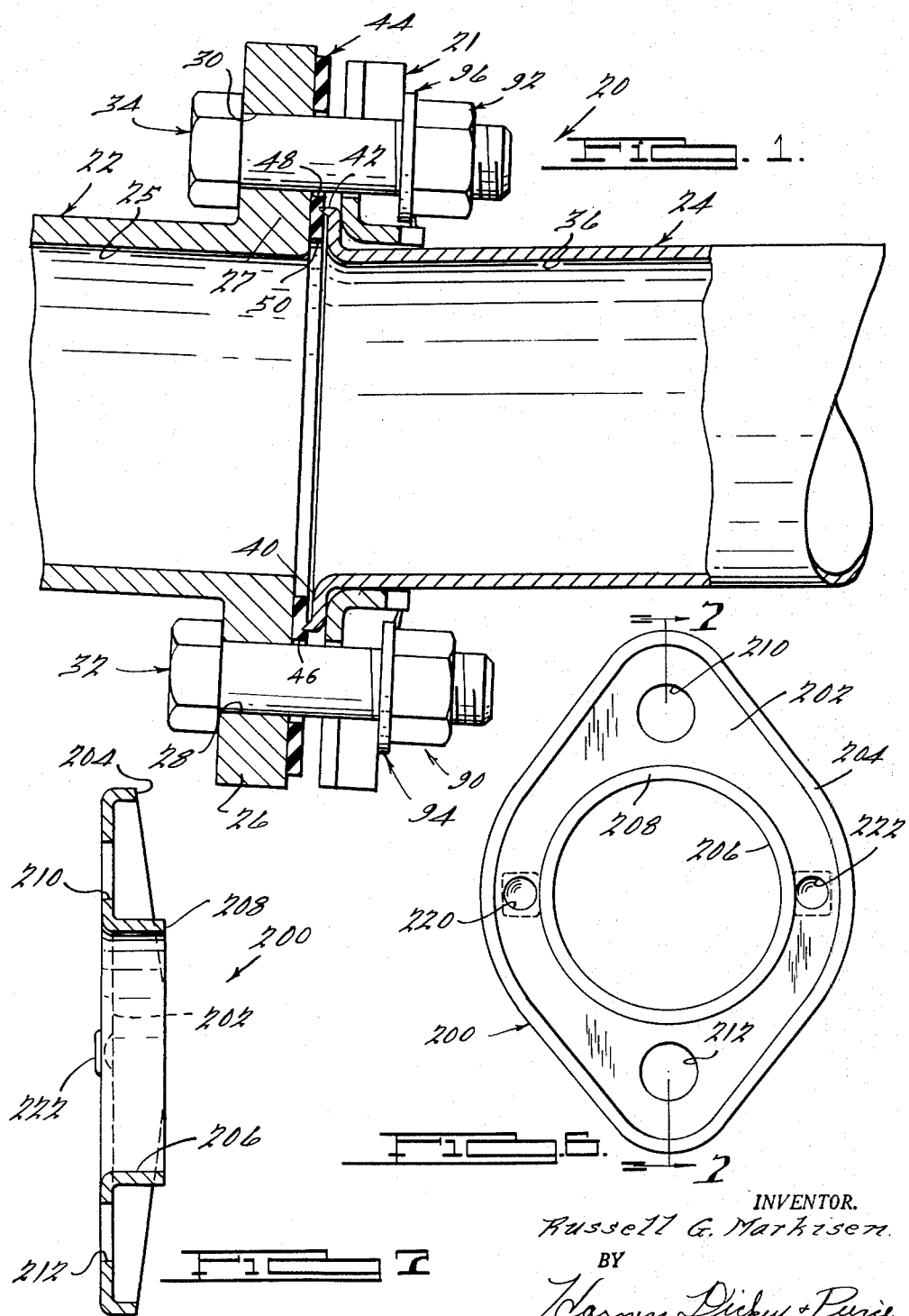

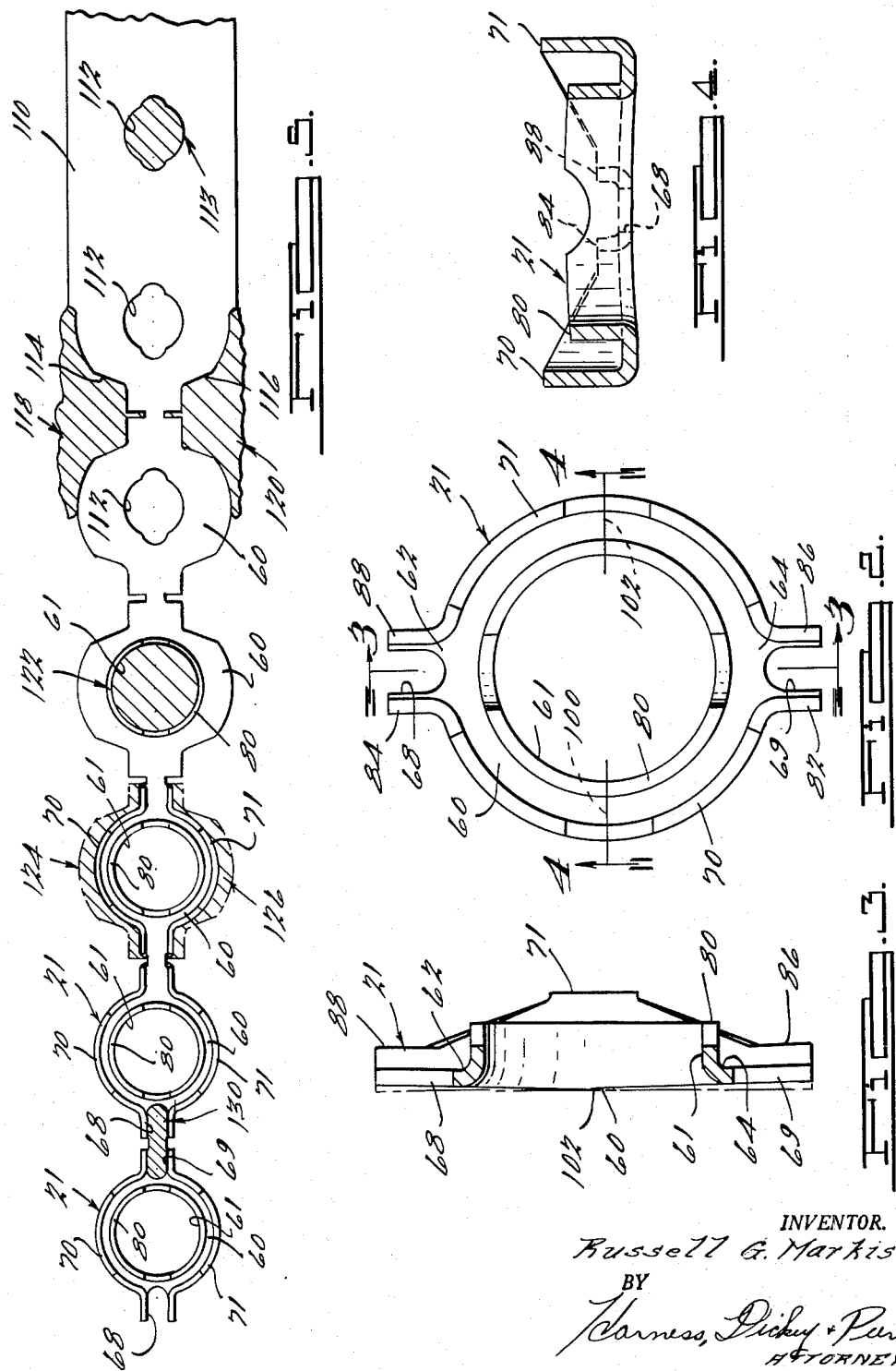

3,179,449
PIPE JOINT HAVING INTERNALLY STRESSED FLANGE PROVIDING CONTINUING AXIAL BIAS
Russell G. Markisen, Racine, Wis., assignor to Walker Manufacturing Company, Racine, Wis., a corporation of Delaware
Filed Nov. 21, 1960, Ser. No. 70,507
2 Claims. (Cl. 285—368)

This invention relates to a connection for adjacent sections of a pipe.

The connection between, for example, the exhaust pipe and the exhaust manifold of an internal combustion engine on a motor vehicle is subjected to relatively severe shock and vibration that often loosens the connection. Failure of this connection results in noisy operation, premature failure of the exhaust system and presents a safety hazard due to the leakage of exhaust gases into the engine and passenger compartments of the motor vehicle.

One reason for the failure of such connections is the inability of conventional lock or spring washers, heretofore used about the retaining bolts that secure the flanges of the exhaust manifold and exhaust pipe, to maintain a bias across the connection. Such lock or spring washers have proved to be inadequate in that the inherent resilience thereof is insufficient to maintain a bias across the connection over an extended period of time.

Accordingly, the present invention is directed to a connection for adjacent lengths of pipe, for example, an exhaust pipe to an exhaust manifold, that includes a novel pipe flange which, upon tightening of the retaining bolts, is internally stressed to maintain a continuing bias across the connection.

Another reason for the failure of such connections is that in some cases a positive seal is not obtained between a gasket and the opposed surfaces of the flanges on the adjacent pipe sections.

Therefore, another feature of a connection in accordance with the present invention is the provision of a biting edge on an axial face of one of the flanges of one of the sections of pipe that is complementary to the aforementioned continued bias thereby to improve contact between the gasket and the flanges of the pipe sections.

Accordingly, one object is an improved connection for adjacent lengths of pipe.

Another object is an improved pipe flange.

Another object is a pipe flange that is internally stressed to maintain a continued bias across a connection.

Another object is a pipe flange that is reinforced by ribs that surround the inner and outer peripheral edges thereof.

Another object is a connection for adjacent lengths of pipe wherein one length of pipe bitingly engages a gasket interposed therebetween.

Another object is an improved method of manufacture of a pipe flange.

Other objects and advantages of the present invention will be apparent in the following detailed description, claims and drawings, wherein:

FIGURE 1 is a cross sectional view of a connection in accordance with an exemplary embodiment of the present invention;

FIG. 2 is a front plan view of a pipe flange employed in the connection of FIGURE 1;

FIG. 3 is a cross sectional view taken substantially along the line 3–3 of FIG. 2;

FIG. 4 is a cross sectional view taken substantially along the line 4–4 of FIG. 3;

FIG. 5 is a diagrammatic view showing the manufacturing steps of a pipe flange in accordance with the present invention;

FIG. 6 is a front plan view of a modified pipe flange; and

FIG. 7 is a cross sectional view taken substantially along the line 7–7 of FIG. 6.

Referring to FIGURE 1, a connection 20, in accordance with an exemplary embodiment of the present invention, comprises a pipe flange 21 shown in operative association with an exhaust manifold 22, and an exhaust pipe 24. The exhaust manifold 22 has a generally circular central passage 26 and a terminal end including a pair of diametrically spaced and radially outwardly extending flanges 26 and 27. The flanges 26 and 27 have a pair of diametrically spaced apertures 28 and 30 therein for the acceptance of a pair of bolts 32 and 34, respectively. The exhaust pipe 24 has a generally circular central passage 36 that terminates in a generally circular radially outwardly extending terminal flange 40.

In accordance with one feature of the present invention, the terminal flange 40 has an axially extending peripheral edge portion or ridge 42 for biting or line engagement with a conventional gasket 44. The ridge 42 insures positive relatively high pressure line engagement between the gasket 44 and flange 40, and between the gasket 44 and the exhaust manifold 22, despite surface irregularities on the opposed axial faces of the flange 40 and manifold 22. The gasket 44 has a pair of apertures 46 and 48 therein for the acceptance of the bolts 32 and 34 and a central aperture 50 for the passage of exhaust gases from the exhaust manifold 22 into the exhaust pipe 24.

The pipe flange 21 comprises a generally annular body portion 60 (FIG. 2) having a central aperture 61 therein for the acceptance of the exhaust pipe 24. The aperture 61 is of substantially the same diameter as the exhaust pipe 24 so that the body portion 60 thereof engages the radially outwardly extending flange 40 on the exhaust pipe 24, upon assembly of the connection 20.

Referring to FIG. 2, the body portion 60 has a pair of diametrically spaced ears 62 and 64 having radially outwardly extending slots 68 and 69 therein, respectively, for the acceptance of the bolts 32 and 34. The body portion 60 has a pair of axially extending flanges 70 and 71 along the opposite outer peripheral edges thereof that extend radially outwardly along the ears 62 and 64 generally parallel to the cutouts 68 and 69 therein to reinforce the ears 62 and 64 against axial flexure. The body portion 60 also has an axially extending flange 80 on the inner periphery thereof that functions to define the aperture 61 and rigidify the pipe flange 21.

As best seen in FIG. 3, the flange portions 70 and 71 on the body portion 60 terminate in a plurality of flats, 82, 84, 86 and 88 for the accommodation and seating of a pair of nuts 90 and 92 on the terminal ends of the locking bolts 32 and 34 (FIG. 1). Suitable washers 94 and 96 may be interposed between the flats 84–86 and 82–88 on the ears 62 and 64, respectively, and the nuts 90 and 92.

In accordance with another feature of the present invention, the flange 21 has a pair of diametrically spaced fulcrums 100 and 102 on the body portion 60 thereof, formed as by coining or stamping the body portion into a generally V-shaped cross sectional configuration, best seen in FIG. 3. The fulcrums 100 and 102 provide for axial bending of the body portion 60 about the fulcrums 100 and 102 to the dotted line position of FIG. 3 upon tightening of the bolts 32 and 34 thereby to internally stress the flange 21 to maintain a continuous bias across the connection 20. In this manner, substantially the entire flange 21 is utilized as a resilient member as opposed to only the relatively small resilient lock washers heretofore employed.

Referring now to FIG. 5, a method of manufacture of the flange 21 comprises a series of operations performed on a blank 110. A first operation comprises the step of punching an aperture 112 in the blank 110 as by a die section 113. A second operation comprises the step of notching the blank 110 at opposite sides 114 and 116 thereof between adjacent ones of the apertures 112, as by die sections 118 and 120, thereby defining one-half of the initial peripheral contour of the body portion 60 of each flange 21 at that particular stage of manufacture, the other half of the peripheral contour being blanked out as the blank 110 moves through the die sections. The next operation comprises the step of axially folding the radially inner portion of the body portion 60 adjacent the aperture 112 to form the inner peripheral flange 80, as by a die section 122. The next successive step comprises folding the outer peripheral edge of the body portion 60 generally normally thereto, to define the outer peripheral flange portions 70 and 71, as by a pair of die sections 124 and 126. The next successive step comprises the blanking out of the diametrically spaced cutouts 68 and 69 of the flange 21 as by a punch 130. This final step in the manufacturing operation separates each terminal end flange 21 from the next adjacent flange 21.

Referring now to FIGS. 6 and 7 of the drawings, a modified pipe flange 200, in accordance with the present invention, comprises a body portion 202 of generally elliptical configuration having an outer peripheral flange 204 folded generally normally thereto for the purpose of reinforcing the body portion 202. The body portion 202 has a central aperture 206 that is surrounded by a normally folded inner peripheral flange 208. A pair of diametrically spaced apertures 210 and 212 provide for the acceptance of a pair of retainer bolts, for example, the bolts 32 and 34, thereby to secure the flange 200 against, for example, the radial flange 40 on the exhaust pipe 24.

In accordance with the present invention, the pipe flange 200 has a pair of diametrically spaced embossments 220 and 222, aligned transversely of a line drawn between the apertures 210 and 212, that function as fulcrums to condition the pipe flange 200 for axial flexure upon tightening of complementary retaining bolts. In this manner, the inherent resilience of substantially the entire flange 200 is utilized to maintain a continuing bias across the connection.

From the foregoing description, it should be apparent that an improved connection in accordance with the present invention features a novel pipe flange that maintains a continuing bias across the connection due to flexure about spaced fulcrums aligned transversely to a line drawn between the bolt-accepting apertures. The continuing bias is complemented by the biting of an axially facing peripheral edge on one of the pipe sections into a gasket interposed between the pipe sections.

It is to be understood that the specific construction of the improved connection herein disclosed and described is presented for the purpose of explanation and illustration and is not intended to indicate limits of the invention, the scope of which is defined by the following claims. Also, the various structural elements may be composed of the conventional materials, e.g., the flange 21 is preferably formed of low carbon steel similar to that used to form the exhaust pipe.

What is claimed is:

1. A connection for sealably joining successive sections of pipe having adjacent radially outwardly extending end flanges, respectively, the end flange on one of said sections extending radially outwardly beyond the end flange on the other of said sections and having a pair of diametrically spaced apertures radially outwardly from the end flange on said other section for the acceptance of a pair of bolts, said connection comprising a pipe flange having an aperture for the acceptance of the other of said pipe sections, said flange having a pair of axially extending embossments defining fulcrums diametrically aligned on opposite sides of the aperture therein engageable with the end flange on the other of said pipe sections, said pipe flange having a pair of diametrically spaced and aligned apertures complementary to the apertures in the end flange of said one section and orientated substantially normally to the alignment of the fulcrums on said pipe flange for the acceptance of said bolts whereby upon tightening of said bolts said pipe flange bends about said fulcrums thereby to maintain a resilient bias across said connection.

2. A pipe flange comprising a body portion having a generally circular aperture for the acceptance of a section of pipe with a radial end flange, the body portion of said pipe flange having an axially extending reinforcing flange about the periphery of the aperture therein and an axially extending flange about the outer periphery thereof, the body portion of said pipe flange having a pair of axially extending embossments defining a pair of fulcrums diametrically aligned on opposite sides of the aperture therein and extending in the opposite direction from said flanges, said embossments being engageable with the end flange on the pipe section, and the body portion of said pipe flange having a pair of diametrically spaced apertures aligned substantially normally to the alignment of the embossments thereon for the acceptance of a pair of bolts whereby upon tightening of said bolts the embossments on said pipe flange engage the end flange on the pipe section and said pipe flange bends axially about the embossments to maintain a continuing bias on the flange of the pipe section.

References Cited by the Examiner

UNITED STATES PATENTS

| 795,376 | 7/05 | Van Stone | 285—328 |
| 1,261,254 | 4/18 | McWane | 285—382.7 |
| 1,684,619 | 9/28 | Endsley. | |
| 1,979,141 | 10/34 | Clark | 285—348 |
| 2,317,665 | 4/43 | Bredehoft. | |
| 2,779,610 | 1/57 | Risley | 285—348 |
| 2,847,820 | 8/58 | Leach | 285—368 X |
| 2,940,779 | 6/60 | Del Buono | 285—363 |

FOREIGN PATENTS

| 439,405 | 1/27 | Germany. |
| 823,758 | 11/59 | Great Britain. |

CARL W. TOMLIN, *Primary Examiner.*

HUNTER C. BOURNE, Jr., *Examiner.*